United States Patent
Ay

(10) Patent No.: US 12,332,341 B2
(45) Date of Patent: Jun. 17, 2025

(54) SYSTEMS AND METHODS FOR AUTOMOTIVE RADAR

(71) Applicant: GM Cruise Holdings LLC, San Francisco, CA (US)

(72) Inventor: Mehmet Serhat Ay, Poing (DE)

(73) Assignee: GM Cruise Holdings LLC, San Francisco, CA (US)

( * ) Notice: Subject to any disclaimer, the term of this patent is extended or adjusted under 35 U.S.C. 154(b) by 559 days.

(21) Appl. No.: 17/497,995

(22) Filed: Oct. 11, 2021

(65) Prior Publication Data

US 2023/0114899 A1    Apr. 13, 2023

(30) Foreign Application Priority Data

Oct. 8, 2021   (EP) ..................... 21201745

(51) Int. Cl.
*G01S 13/87*    (2006.01)
*G01S 7/03*    (2006.01)
(Continued)

(52) U.S. Cl.
CPC ............. *G01S 13/878* (2013.01); *G01S 7/03* (2013.01); *G01S 13/931* (2013.01); *G01S 2013/93271* (2020.01)

(58) Field of Classification Search
None
See application file for complete search history.

(56) References Cited

U.S. PATENT DOCUMENTS

2014/0306846 A1    10/2014   Nakatsu et al.
2020/0079364 A1*   3/2020   Min ................ B60W 30/18163
(Continued)

FOREIGN PATENT DOCUMENTS

CN   112213720 A  *  1/2021  ............. G01S 13/87
DE   102020101332 A1   8/2020
EP   4163665 A1   4/2023

OTHER PUBLICATIONS

"Response to the Communication Pursuant to Rule 69 EPC for European Patent Application No. 21201745.3", Filed Date: Oct. 12, 2023, 12 pages.

(Continued)

*Primary Examiner* — Bernarr E Gregory
*Assistant Examiner* — Juliana Cross
(74) *Attorney, Agent, or Firm* — Honigman LLP; Matthew H. Szalach; Jonathan P. O'Brien

(57) ABSTRACT

A radar sensor includes a flexible printed circuit board (PCB). A first antenna or antenna array is mounted on a first portion of the flexible PCB, and a second antenna or antenna array is mounted on a second portion of the flexible PCB. The first portion and the second portion of the flexible PCB are offset such that the first and second antennas/arrays have respective first and second fields-of-view (FOVs) that are offset from one another. The first and second antennas/arrays can be coupled to a same backend PCB that includes a hardware logic component. The hardware logic component is configured to receive, from the flexible PCB, radar data that is representative of the radar returns received by the first and second antennas/arrays. The hardware logic component processes the radar data to generate detections that are indicative of points on surfaces of objects in the first and second FOVs.

17 Claims, 8 Drawing Sheets

(51) Int. Cl.
  *G01S 13/93*   (2020.01)
  *G01S 13/931*  (2020.01)

(56) References Cited

U.S. PATENT DOCUMENTS

2020/0266519 A1* 8/2020 Lee .......................... H01Q 1/38
2021/0263146 A1* 8/2021 Otowa .................... G01S 13/87
2021/0305720 A1* 9/2021 Zhang ..................... H01Q 1/38

OTHER PUBLICATIONS

"Extended European Search Report for European Patent Application No. 21201745.3", Mailed Date: Mar. 29, 2022, 8 pages.

* cited by examiner

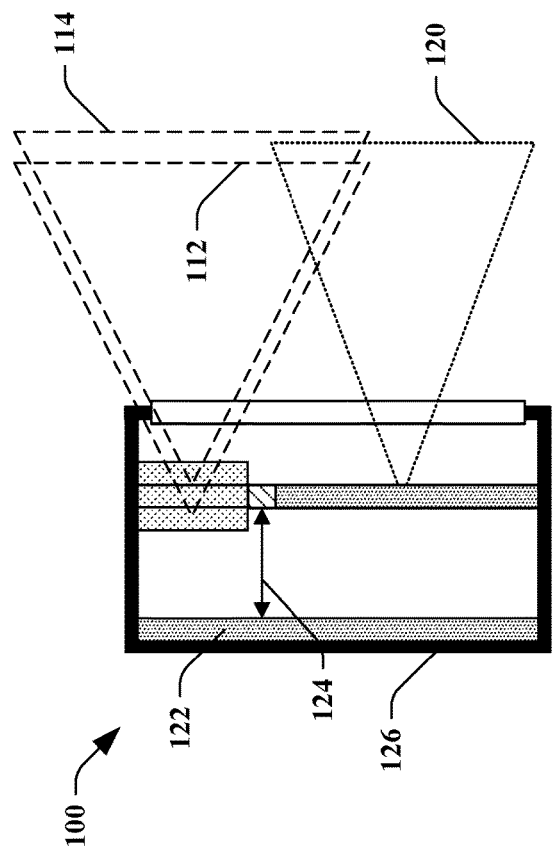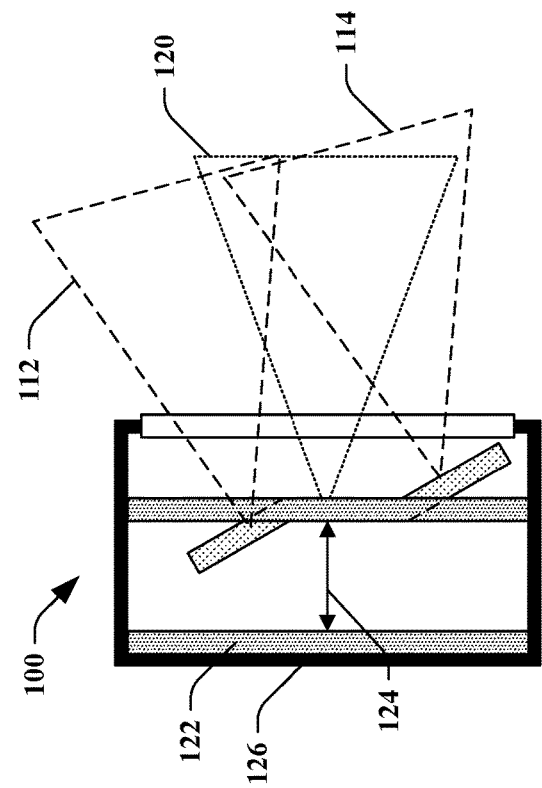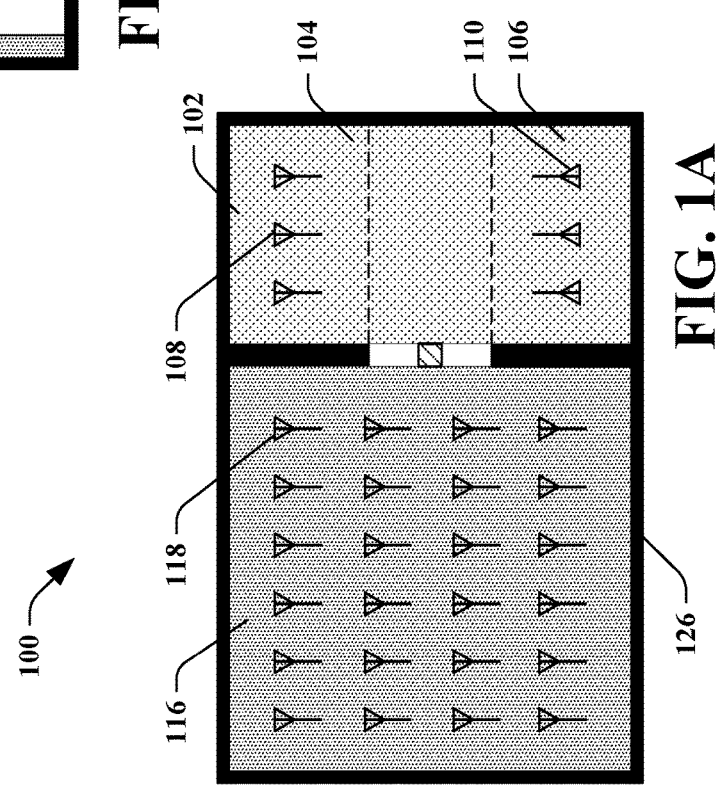

SYSTEMS AND METHODS FOR AUTOMOTIVE RADAR

RELATED APPLICATION

This application claims priority to European Patent Application No. EP21201745.3, filed on Oct. 8, 2021, and entitled "SYSTEMS AND METHODS FOR AUTOMOTIVE RADAR". The entirety of this application is incorporated herein by reference.

BACKGROUND

Radar systems are now being employed for various purposes on various types of vehicles such as air vehicles, mining vehicles, and ground vehicles such as cars, trucks, and autonomous vehicles (AVs). An AV is a vehicle that navigates through a driving environment without human conduction. Radar systems can be used to generate radar data indicative of positions of objects in a driving environment of a vehicle (e.g., a range and direction to a surface of an object in the driving environment), and/or velocities of objects in the driving environment.

Automotive radar systems can include multiple distinct radar sensors to provide radar coverage of multiple fields-of-view (FOVs) about a vehicle. Conventionally, each of these radar sensors is configured to independently output data that is indicative of positions and/or velocities of objects in the driving environment. Therefore, in some instances a radar system employing multiple radar sensors generates conflicting information about the presence of objects in the driving environment that must then be resolved by a downstream computing system. Furthermore, typically each of these radar sensors includes its own sampling and signal processing circuitry, which can increase weight and power draw of an automotive radar system.

SUMMARY

The following is a brief summary of subject matter that is described in greater detail herein. This summary is not intended to be limiting as to the scope of the claims.

Described herein are various technologies pertaining to a radar sensor that has multiple antenna surfaces, such that the radar sensor is equipped for simultaneous and/or interleaved observation for multiple FOVs, which can be overlapped. In an exemplary embodiment, a radar sensor includes a flexible printed circuit board (PCB). The flexible PCB can include a first portion and a second portion, wherein the first and second portions of the PCB are offset from one another. The first portion of the PCB includes a first radar antenna, which can be configured for transmission (TX) and/or reception (RX) of radar signals. The second portion of the PCB includes a second radar antenna, that similarly can be configured for TX and/or RX. Due to the offset of the first and second portions of the PCB, the first and second radar antennas have respective first and second FOVs. The first radar antenna receives a first radar return from the first FOV. The first radar return can be a reflection of a radar signal emitted by the first radar antenna into the first FOV. The second radar antenna receives a second radar return from the second FOV. The second radar return can be a reflection of a radar signal emitted by the second radar antenna into the second FOV. In some cases, the first FOV and the second FOV can overlap, and the first radar antenna can receive radar returns of signals emitted by both of the first antenna and the second antenna, and likewise the second radar antenna can receive radar returns of signals emitted by both of the first antenna and the second antenna.

In various embodiments, the first and second radar antennas can be coupled to a same radar sensor backend (e.g., a second PCB) that includes a hardware logic component, such as a field-programmable gate array (FPGA) or an application-specific integrated circuit (ASIC). The radar sensor backend can further include power management and data interface components. In exemplary embodiments, the hardware logic component is configured to receive analog electrical signals that are output by analog signal conditioning components coupled to the first and second radar antennas, wherein the analog electrical signals are indicative of the radar returns received by the first and second antennas. In such embodiments, the hardware logic component is configured to digitally sample the analog electrical signals to generate digital radar data that is indicative of the radar returns received by the first and second antennas. In other embodiments, the PCB that includes the first and second antennas can include analog-to-digital converters (ADCs) that are configured to digitally sample the radar returns received by the first and second antennas in order to generate digital radar data that are indicative of the radar returns received by the first and second radar antennas. In these embodiments, the hardware logic component receives the digital radar data from the ADCs.

The hardware logic component on the common radar sensor backend is configured to process the digital radar data (e.g., received from ADCs on the frontend PCB or generated by the hardware logic component at the backend PCB) to identify a detection. A detection is representative of a point in space at which a radar signal impinged on a surface of an object. A detection or group of detections can be representative of the presence of an object at a location in one of the FOVs of the first and second antennas. A detection can include a set of three-dimensional spatial coordinates and can further include a velocity of the point on the surface of the object relative to the radar sensor. By virtue of the first and second radar antennas having the different first and second FOVs, respectively, the hardware logic component can have improved performance in identifying the velocity associated with a detection as compared with a radar sensor that processes radar data from only a single antenna FOV.

The hardware logic component included in the radar sensor can output the detection to a computing system. By way of example, and not limitation, the radar sensor can be included on an AV that is configured to navigate through a driving environment without human conduction, wherein the AV includes a computing system that is configured to perform perception, planning, and control functions of the AV. The computing system receives the detection from the hardware logic component, and can identify a presence of an object, a type of the object, motion of the object, etc., based in part upon the detection. The computing system can further compute a planned maneuver for the AV based upon the presence, type, and/or motion of the object, which maneuver can further be executed by the AV.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1A is a front-facing view of an exemplary radar sensor.

FIG. 1B is a side-facing view of the exemplary radar sensor of FIG. 1A.

FIG. 1C is a top-down view of the exemplary radar sensor of FIG. 1A.

DETAILED DESCRIPTION

Figure 2:
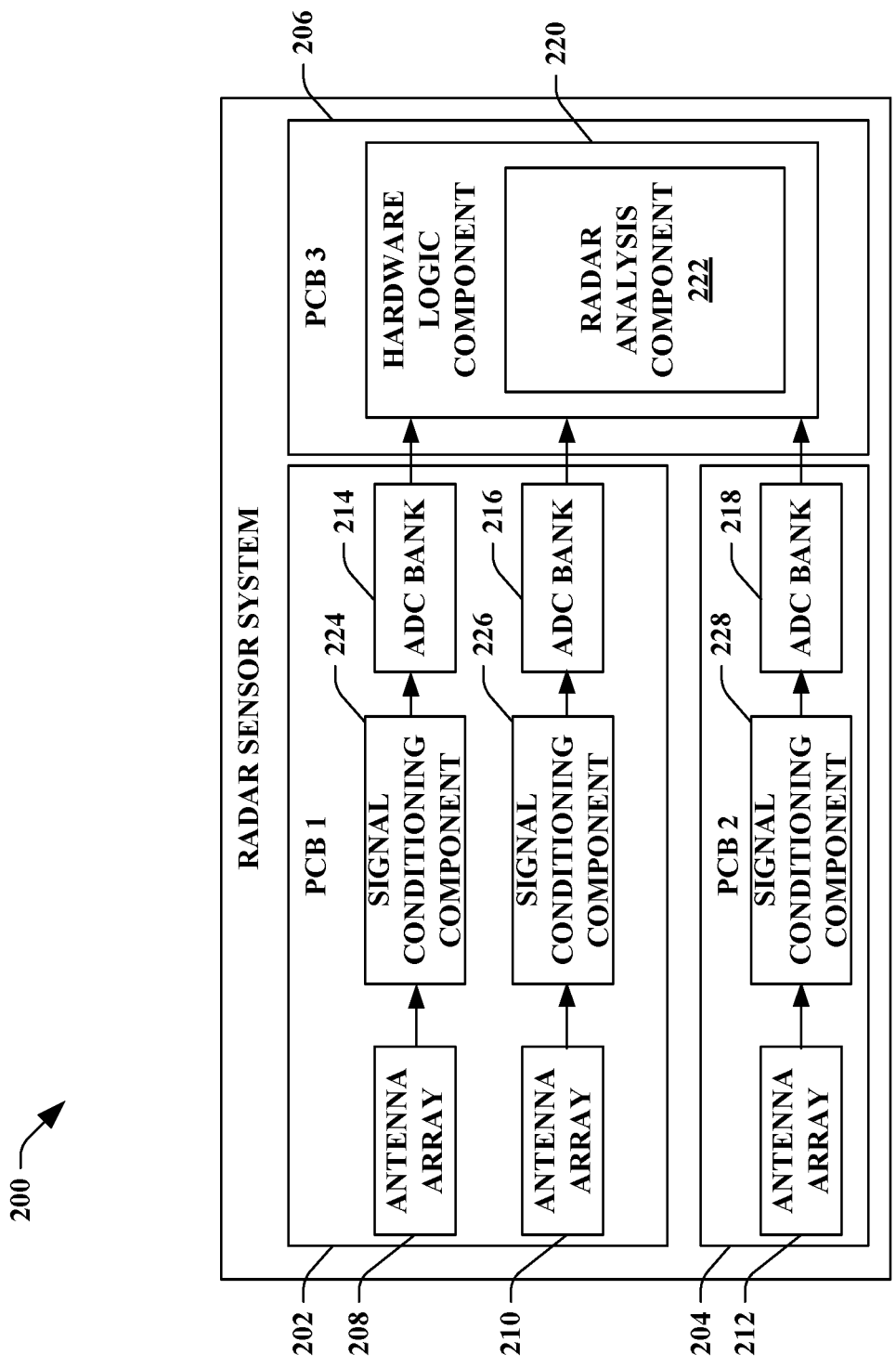
FIG. 2 is a functional block diagram of an exemplary radar sensor system.

Various technologies pertaining to an automotive radar sensor that includes radar sensors with different FOVs are described herein, wherein like reference numerals are used to refer to like elements throughout. With more particularity, technologies described herein pertain to a radar sensor that incorporates a flexible PCB, wherein the flexible PCB has portions that are offset from one another, such that radar antennas positioned on these portions have different FOVs. As used herein, unless otherwise specifically noted, the term PCB is intended to include a PCB-assembled (PCBA) that has various electronic components formed or installed thereon. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

With reference now to FIGS. 1A-1C, an exemplary radar sensor 100 is illustrated. FIG. 1A depicts a front-facing view of the radar sensor 100. FIG. 1B depicts a side-facing view of the radar sensor 100. FIG. 1C is a top-down view of the radar sensor 100. Referring once again to FIGS. 1A-1C collectively, the radar sensor 100 includes a first frontend PCB 102 that includes a first portion 104 and a second portion 106. In exemplary embodiments, the first portion 104 and the second portion 106 are substantially planar. The PCB 102 can be a flexible PCB that can be bent into a desired shape. In exemplary embodiments, the PCB 102 is a semi-rigid PCB that, once bent into the desired shape, holds the shape without external constraint until the PCB 102 is bent again. In other exemplary embodiments, the PCB 102 is a flexible PCB that can be readily bent into a desired shape but that does not hold this shape without external constraint. In these other embodiments, the PCB 102 can be held in a desired shape/position by way of a housing (e.g., a housing 126 of the sensor 100) and/or various fasteners or other holding components. As used herein, the term "flexible PCB" is intended to encompass semi-rigid PCBs and flexible PCBs that do not hold their shape without external constraint. The first portion 104 of the PCB 102 is offset from the second portion 106 of the PCB 102, such that the first portion 104 and the second portion 106 are not aligned in the same plane. The first portion 104 of the PCB 102 includes a first antenna 108. The second portion 106 of the PCB 102 includes a second antenna 110. By virtue of the portions 104, 106 of the PCB 102 being offset, the first antenna 108 and the second antenna 110 have different FOVs. Thus, the first antenna 108 has a first FOV 112 and the second antenna 110 has a second FOV 114.

As used herein, the FOV of an antenna refers to a region of space from which the antenna receives radar returns. In some embodiments, the first antenna 108 can be the sole antenna positioned on the first portion 104 of the PCB 102. Further, the second antenna 110 can be the sole antenna positioned on the second portion 106 of the PCB 102. In other exemplary embodiments, the first antenna 108 can be one of a first plurality of antennas that form a first array, and the second antenna 110 can be one of a second plurality of antennas that form a second array. In such embodiments, the FOVs 112, 114 can refer to FOVs of the first and second arrays, respectively. Hence, the FOV of a first antenna array positioned on the first portion 104 of the PCB 102 can be the first FOV 112 and the FOV of a second antenna array positioned on the second portion 106 of the PCB 102 can be the second FOV 114 that is offset from the first FOV 112. The present disclosure contemplates that the FOV of an antenna array includes any region of space into which the antenna array can be configured to emit or receive a radar signal by beamforming techniques.

In various embodiments, the PCB 102 is configured such that while the FOVs 112, 114 are offset, the FOVs 112, 114 substantially overlap in a far-field of the antennas 108, 110.

For example, in the exemplary radar sensor 100, the portions 104, 106 of the PCB 102 are arranged such that the FOVs 112, 114 are aimed in a same direction. In various exemplary embodiments, the portions 104, 106 of the PCB 102 can be arranged such that the FOVs 112, 114 are aimed in directions that are offset by for example less than 15 degrees, less than 10 degrees, or less than 5 degrees.

The radar sensor 100 can further include a second frontend PCB 116. In various embodiments, the second frontend PCB 116 can be a conventional rigid PCB. The second frontend PCB 116 can include a third antenna 118 that has a third FOV 120 that is distinct from the FOVs 112, 114 of the antennas 108, 110 mounted on the flexible PCB 102. The third antenna 118 can be included in a plurality of antennas that are formed on the second frontend PCB 116 and that collectively form a third antenna array. The FOV 120 of the third antenna 118 can overlap with one or more of the FOVs 112, 114 of the antennas 108, 110.

The radar sensor 100 further includes a backend PCB 122. The backend PCB 122 is coupled to the frontend PCBs 102, 116 by way of a communications link 124. The communications link 124 can be or include any of various interfaces configured to facilitate transfer of data and/or other electrical signals from the frontend PCBs 102, 116 to the backend PCB 122, or vice versa. The backend PCB 122 includes componentry that is configured to facilitate identification of surfaces of objects within the FOVs 112, 114, 120 of the antennas 108, 110, 118, respectively, as will be described in greater detail below. The backend PCB 122 and the frontend PCBs 102, 116 can be mounted in a common housing 126.

Referring now to FIG. 2, a functional block diagram of an exemplary radar sensor system 200 is shown. In exemplary embodiments, the exemplary radar sensor system 200 can be the radar sensor 100. The radar sensor 200 includes two frontends PCBs 202, 204 and a backend PCB 206. The first frontend PCB 202 includes a first antenna array 208 and a second antenna array 210. The second frontend PCB 204 includes a third antenna array 212. In exemplary embodiments, the first frontend PCB 202 can be a flexible PCB that has offset first and second portions (e.g., similarly to the PCB 102) such that the first antenna array 208 and the second antenna array 210 have different FOVs. In further embodiments, the second frontend PCB 204 can be a rigid PCB. However, it is to be understood that in some embodiments the second frontend PCB 204 can also be a flexible PCB.

The frontend PCBs 202, 204 can include signal conditioning components 224-228 that are configured to perform various signal conditioning operations on the outputs of the antenna arrays 208-212, respectively. By way of example, and not limitation, the signal conditioning components 224-228 can be configured to perform intermediate frequency processing, anti-alias filtering, or the like. The frontend PCBs 202, 204 can further include ADC banks 214-218 that are configured to digitally sample the conditioned outputs of the antenna arrays 208-212 (e.g., as output by the signal conditioning components 224-228) to generate digital radar data that is indicative of radar returns received by the antenna arrays 208-212. The first frontend PCB 202 includes a first ADC bank 214 that digitally samples analog outputs of the first antenna array 208. The first frontend PCB 202 further includes a second ADC bank 216 that digitally samples analog outputs of the second antenna array 210. The second frontend PCB 204 can include a third ADC bank 218 that digitally samples analog outputs of the third antenna array 212. It is to be understood that each of the ADC banks 214-218 can include multiple ADCs, each of which is configured to digitally sample analog the output of one or more antennas in its corresponding antenna array. It is to be understood that in some embodiments, the ADC banks 214-218 can be included on the backend PCB 206.

The backend PCB 206 is electrically coupled to the frontend PCBs 202, 204 such that the backend PCB 206 send/receives data and/or electrical signals to/from the frontend PCBs 202, 204. The backend PCB 206 includes a hardware logic component 220 that receives digital radar data from the ADC banks 214-218. The hardware logic component 220 includes a radar analysis component 222 that is configured to process the digital radar data and to output one or more detections based upon the digital radar data. A detection is indicative of a position of a point or points on a surface of an object in one of the FOVs of the antenna arrays 208-212. The detection can further indicate a velocity of the point relative to one or more of the antenna arrays 208-212.

Use of the common hardware logic component 220 on the common backend PCB 206 to process radar data pertaining to the various antenna arrays 208-212 can improve the ability of the hardware logic component 220 to generate detections that accurately reflect the environment about the radar sensor system 200. For instance, in embodiments where FOVs of the arrays 208-212 overlap, a radar return from one of the arrays 208-212 can be processed to identify, confirm and/or correct an error in a detection generated based upon a radar return from another of the arrays 208-212. Further, use of the common hardware logic component 220 on the common backend PCB 206 to process radar data from the multiple frontend PCBs 202, 204 can facilitate reconfiguration of the radar sensor system 200 to include more or fewer frontend antenna arrays without requiring a reconfiguration of backend processing circuitry. Additionally, positioning of the multiple antenna arrays 208, 210 on the same frontend PCB 202 rather than across multiple PCBs can simplify signal distribution across the antennas of the arrays 208, 210, such as by making it easier to maintain known phase relationships between signals output by the arrays 208, 210.

Figure 3:
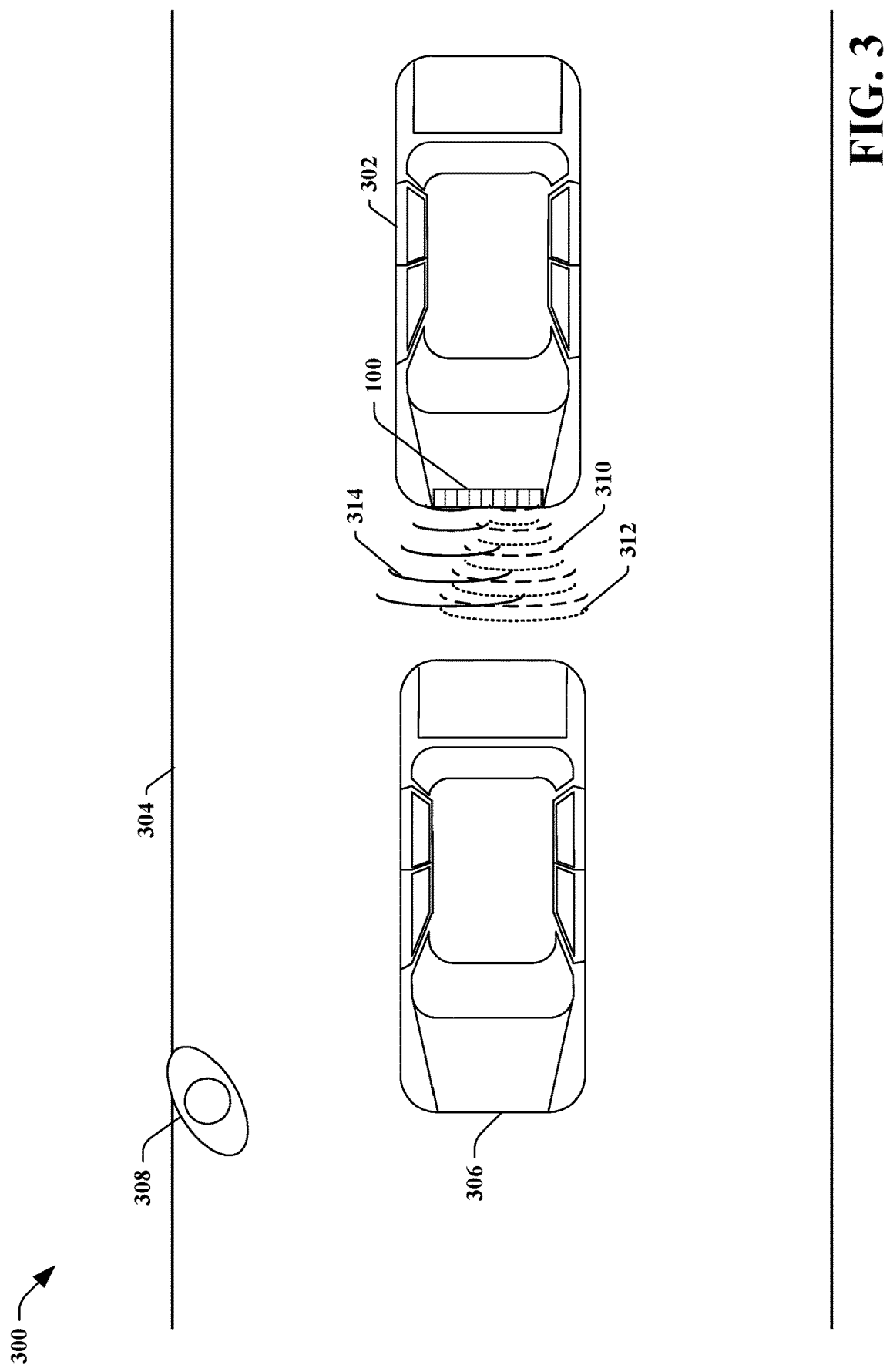
FIG. 3 is a top-down view of an exemplary driving environment of a vehicle that includes the radar sensor of FIGS. 1A-1C.

In some embodiments, such as the radar sensor 100 shown in FIGS. 1A-1C, the FOVs of different antenna arrays (e.g., such as arrays including the antennas 108, 110) can be aimed in a same direction such that the FOVs substantially overlap. Referring now to FIG. 3, an exemplary driving environment 300 of a vehicle 302 that includes the radar sensor 100 is shown. The driving environment 300 includes a roadway 304 on which the vehicle 302 is traveling, a second vehicle 306 traveling on the same roadway 304, and a pedestrian 308 standing at an edge of the roadway 304. The first antenna 108 emits a first radar signal 310, the second antenna 110 emits a second radar signal 312, and the third antenna 118 emits a third radar signal 314. While the radar signals 310-314 are described herein as being emitted by the antennas 108, 110, 118, respectively, it is to be understood that these signals 310-314 can be emitted by respective arrays that include the antennas 108, 110, 118. Furthermore, it is to be understood that in some embodiments the radar sensor 100 can be configured such that not all of the antennas 108, 110, 118 operate in a transmit mode. By way of example, and not limitation, the antenna 118 can be configured to transmit the radar signal 314, and the antennas 108, 110 can be configured to receive returns of the radar signal 314 from FOVs having a same extent as the radar signals 310, 312 shown in FIG. 3.

As indicated in FIG. 3, the first radar signal 310 and the second radar signal 312 are emitted into a substantially similar space in front of the vehicle 302 by virtue of the respective FOVs 112, 114 of the antennas 108, 110 being pointed in a same direction. Due to proximity of the vehicle 302 to the vehicle 306, the pedestrian may be outside of the FOVs 112, 114 of the antennas 108, 110 (e.g., because the pedestrian is occluded by the vehicle 306). However, the pedestrian may be within the FOV 120 of the third antenna 118. Due to the second vehicle 306 being within the FOVs 112, 114, 120 of all of the antennas 108, 110, 118 of the radar sensor 100, the radar sensor 100 can have improved performance with respect to determining an elevation and/or a velocity of a point on the second vehicle 306 as compared to a point on the pedestrian 308, which is only in the FOV 120 of the antenna 118.

Figure 4:
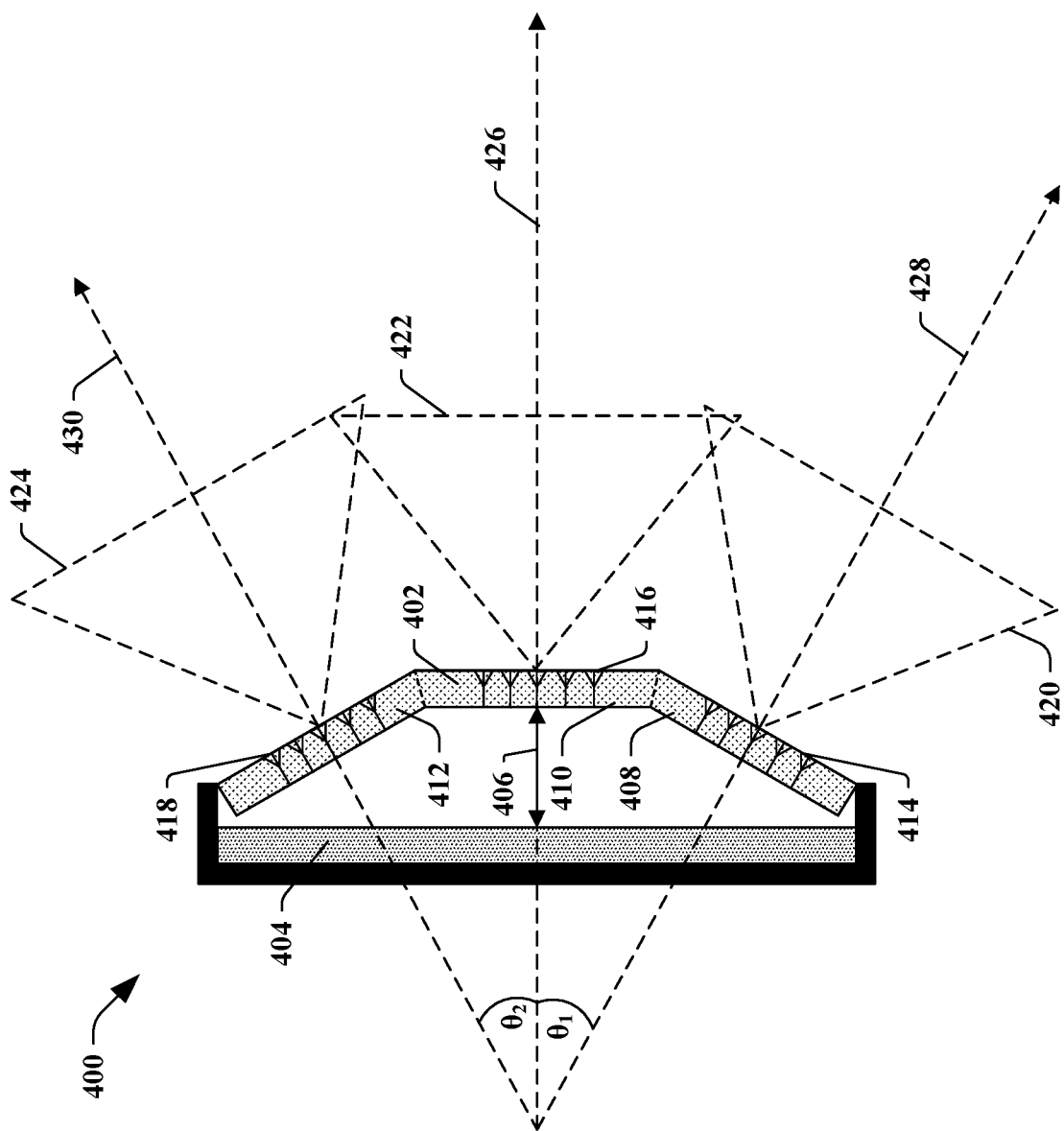
FIG. 4 is a top-down view of another exemplary radar sensor.

In other embodiments, a radar sensor can be configured to have antennas with FOVs that are aimed in different directions such that the FOVs include different regions of space. For example, and with reference now to FIG. 4, another exemplary radar sensor 400 is shown, wherein the radar sensor 400 includes a flexible frontend PCB 402, a backend PCB 404, and a communications link 406 between the frontend PCB 402 and the backend PCB 404. The backend PCB 404 includes a hardware logic component (not illustrated in FIG. 4) such as the hardware logic component 220 shown in FIG. 2. The frontend PCB 402 includes portions 408-412 that are offset from one another. The first portion 408 of the frontend PCB 402 includes a first antenna array 414. The second portion 410 of the frontend PCB 402 includes a second antenna array 416. The third portion 412 of the frontend PCB 402 includes a third antenna array 418.

The portions 408-412 of the frontend PCB 402 are offset from one another such that FOVs 420-424 of the antenna arrays 414-418, respectively, are aimed in different directions. In a non-limiting example, the FOV 422 of the second antenna array 416 can be aimed in a direction 426. The FOV 420 of the first antenna array 414 can be aimed in a direction 428 that is offset from the direction 426 of the second antenna array 416 by an angle $\theta_1$. The FOV 424 of the third antenna array 418 can be aimed in a direction 430 that is offset from the direction 426 of the second antenna array 416 by an angle $\theta_2$. In exemplary embodiments, $\theta_1=-\theta_2$. In these and other embodiments, $\theta_1$ can be, for example between 10° and 60°, between 20° and 50°, or between 30° and 45°, depending upon an intended application of the radar sensor 400.

Figure 5:
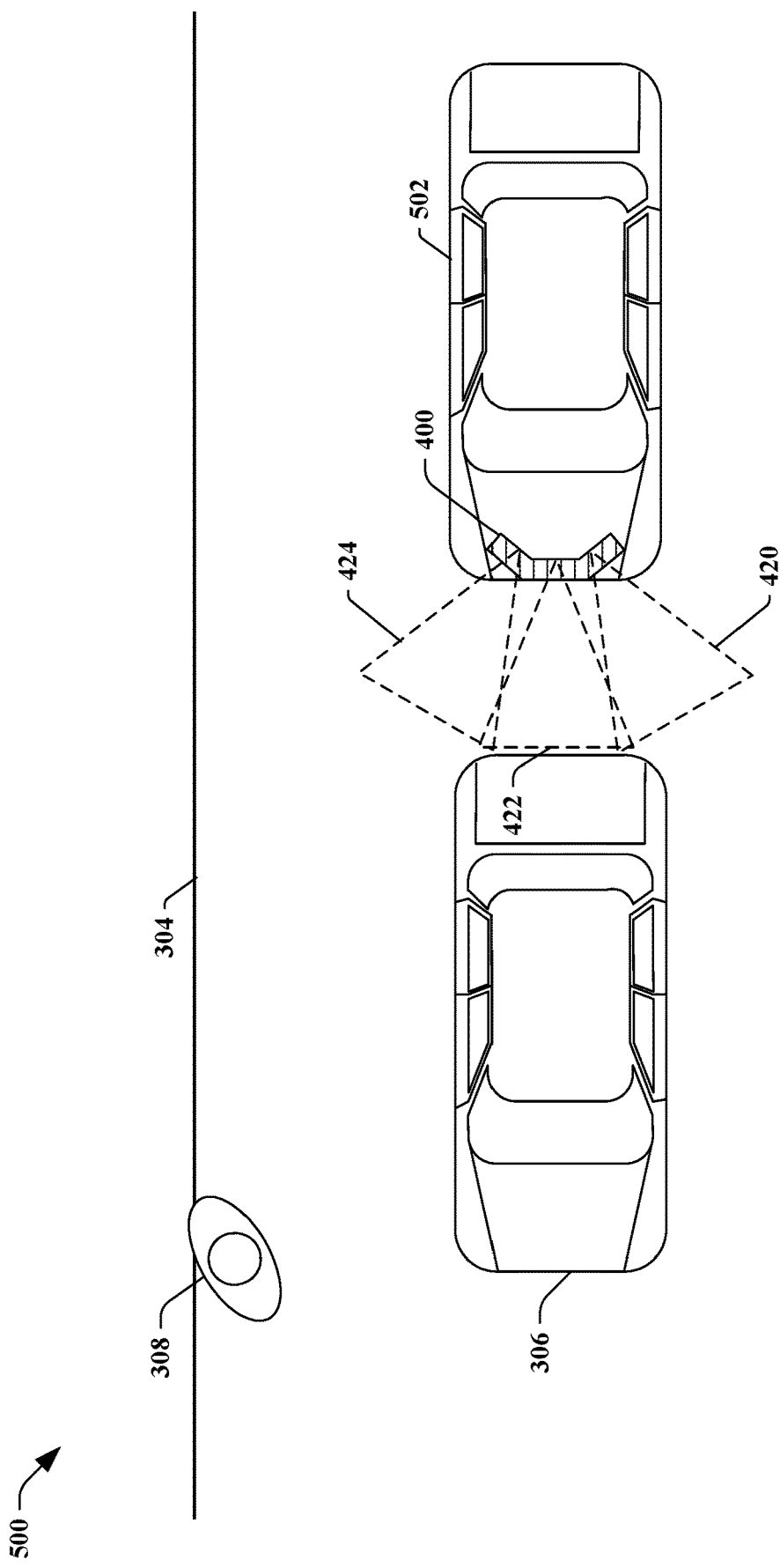
FIG. 5 is a top-down view of an exemplary driving environment of a vehicle that includes the radar sensor of FIG. 4.

The radar sensor 400 can, using a single sensor package, facilitate detection of objects about a vehicle in environments where some objects may be partially occluded by other objects. Referring now to FIG. 5, an exemplary driving environment 500 is shown, wherein the driving environment includes the roadway 304, the vehicle 306, the pedestrian 308, and a vehicle 502 on which the radar sensor 400 is mounted. In the driving environment 500, the pedestrian 308 may be obscured from the FOV 422 of the middle antenna array 416 of the radar sensor 400 by the vehicle 306. However, due to the antenna array 418 of the radar sensor 400 being aimed in a different direction from the middle antenna array 416, the FOV 424 of the antenna array 418 can include the pedestrian 308.

It is to be appreciated that a flexible frontend PCB of a radar sensor constructed in accordance with the present disclosure can be arranged in any of various configurations, depending upon a desired relative position of FOVs of antennas mounted/designed on the flexible frontend PCB. For example, the flexible frontend PCB can be configured with planar portions that are aligned in a same direction but offset from one another (e.g., such that their planes are parallel to one another). In other examples, the flexible frontend PCB can be configured with planar portions that are arranged so that FOVs of antenna arrays mounted on the various portions are aimed in different directions. In some embodiments, a flexible frontend PCB can be configured with a curved portion.

Figure 6:
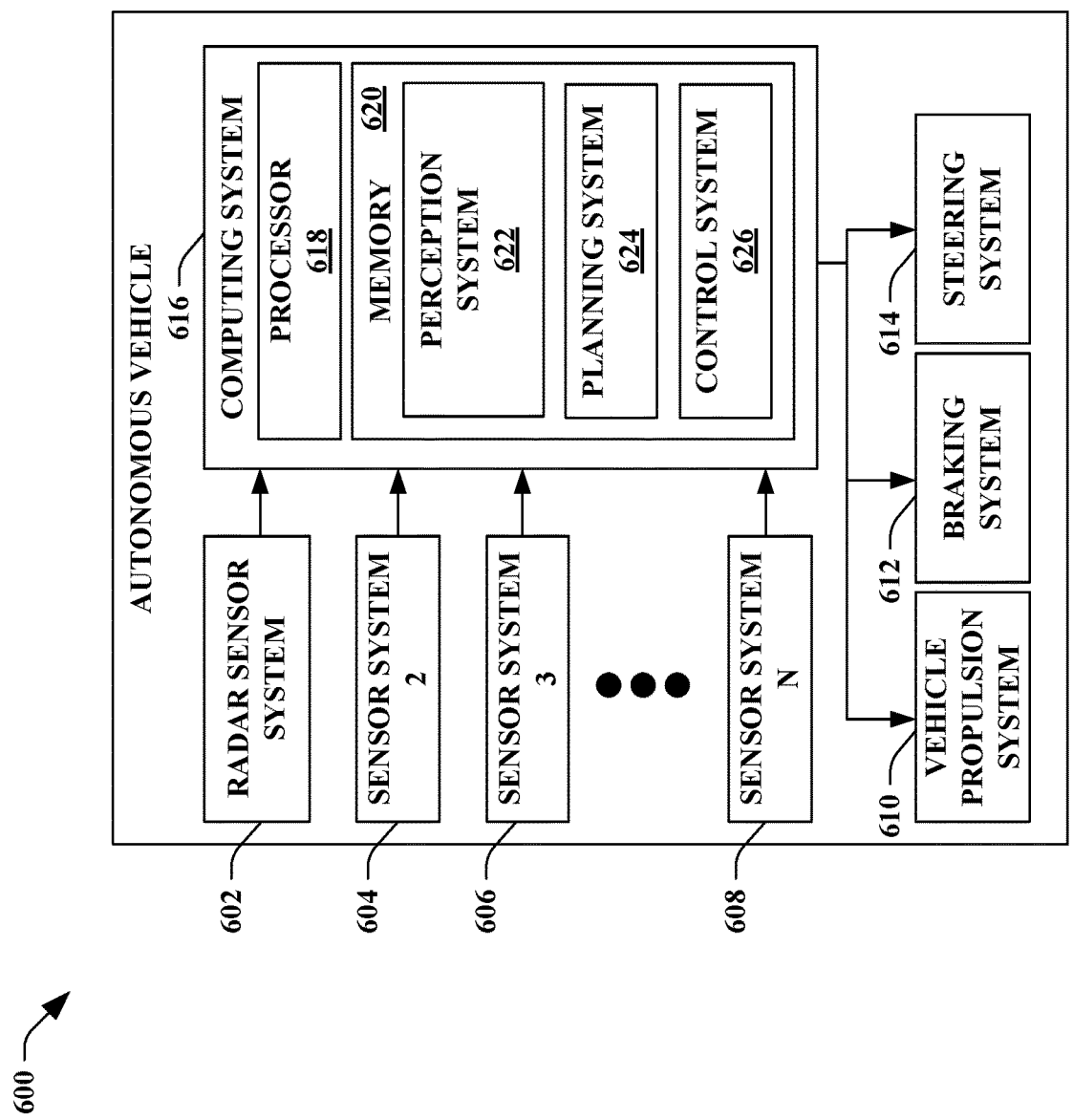
FIG. 6 is a functional block diagram of an exemplary AV.

Radar sensors described herein that include flexible PCBs and multiple antenna arrays mounted thereon (e.g., the radar sensors 100, 400) are well-suited to use on autonomous vehicles AVs. With reference now to FIG. 6, an exemplary AV 600 is illustrated. The AV 600 can navigate about roadways without human conduction based upon sensor signals output by sensor systems of the AV 600. The AV 600 includes a radar sensor system 602 and a plurality of additional sensor systems 604-608 (a second sensor system 604 through an Nth sensor system 608). In various exemplary embodiments, the radar sensor system 602 can be or include the radar sensor 100 or the radar sensor 400. The sensor systems 604-608 may be of different types. For example, the second sensor system 604 may be a lidar sensor system, the third sensor system 606 may be a camera (image) system, and the Nth sensor system 608 may be a sonar system. Other exemplary sensor systems include GPS sensor systems, inertial sensor systems, infrared sensor systems, and the like. In further embodiments, the additional sensor system 604-608 can be additional radar sensor systems. The various sensor systems 602-608 are arranged about the AV 600. The sensor systems 602-608 are configured to repeatedly (e.g. continuously, or periodically) output sensor data that is representative of objects and conditions in the driving environment of the AV 600.

The AV 600 further includes several mechanical systems that are used to effectuate appropriate motion of the AV 600. For instance, the mechanical systems can include but are not limited to, a vehicle propulsion system 610, a braking system 612, and a steering system 614. The vehicle propulsion system 610 may be an electric engine, an internal combustion engine, or a combination thereof. The braking system 612 can include an engine brake, brake pads, actuators, a regenerative braking system, and/or any other suitable componentry that is configured to assist in decelerating the AV 600. The steering system 614 includes suitable componentry that is configured to control the direction of movement of the AV 600.

The AV 600 additionally comprises a computing system 616 that is in communication with the sensor systems 602-608 and is further in communication with the vehicle propulsion system 610, the braking system 612, and the steering system 614. The computing system 616 includes a processor 618 and memory 620 that includes computer-executable instructions that are executed by the processor 618. In an example, the processor 618 can be or include a graphics processing unit (GPU), a plurality of GPUs, a central processing unit (CPU), a plurality of CPUs, an ASIC, a microcontroller, a programmable logic controller (PLC), an FPGA, or the like.

The memory 620 comprises a perception system 622, a planning system 624, and a control system 626. Briefly, the perception system 622 is configured to identify and/or classify objects in proximity to the AV 600 that are captured in sensor signals output by the sensor systems 602-608. The planning system 624 is configured to plan a route and/or a maneuver for the AV 600 to travel based in part upon the objects identified by the perception system 622. The control system 626 is configured to control operations of one or more of the propulsion system 610, the braking system 612, or the steering system 614 to effectuate motion of the AV 600 in accordance with a route plan or maneuver generated by the planning system 624.

The radar sensor system 602 can be configured to output, to the computing system 616, detection data that is indicative of points on surfaces of objects in the driving environment of the AV 600 and/or velocities of those points relative to the AV 600. These identified points can be referred to as "detections," and can be generated by the radar sensor system 602 based upon radar returns received by the radar sensor system 602 from the driving environment of the AV 600. In exemplary embodiments, the perception system 622 can be configured to identify the presence of an object in the driving environment based upon detections output by the radar sensor system 602. For example, the perception system 622 can be configured to identify a region of space that includes a single object based upon detections output by the radar sensor system 602.

It is to be understood, however, that in some embodiments the perception system 622 can also be configured to generate the detection data based upon radar returns received by antennas included in the radar sensor system 602. For instance, the radar sensor system 602 can digitally sample radar signals received by the radar sensor system 602 to generate radar data, which radar data is output to the computing system 616. In such embodiments, the perception system 622 can be configured to generate the detection data based upon the radar data received from the radar sensor system 602.

The perception system 622 can further be configured to identify one or more features of an object in the driving environment of the AV 600. In a non-limiting example, the perception system 622 can be configured to determine a type of an object (e.g., a vehicle, a pedestrian, a bicycle, etc.) based upon images output by a camera, the presence of which object was detected by the perception system 622 (e.g., based upon detections output by the radar sensor system 602).

Conventionally, automotive radar systems are configured such that each antenna array is coupled to its own hardware logic component that generates detection data pertaining to that array's radar returns. For example, in a conventional automotive radar system, a different radar sensor is employed to generate detection data for each of several different FOVs that are desirably interrogated by different radar antenna arrays. In the context of the AV 600, each of these radar sensors would output its own detection data to the computing system 616. However, in such a conventional automotive radar system, the detection data of each of the radar sensors may be contradictory and/or duplicative (e.g., due to overlapping FOVs), and the detections of each of the radar sensors may be specified in different coordinate systems. Thus, when coupled to a conventional automotive radar system that employs multiple radar sensors, the perception system 622 may need to expend computing resources to resolve conflicts and process duplicative data from among the detection data generated by each of the radar sensors, or reconcile the detection data from the various sensors to a common coordinate system.

The radar sensors 100, 400 employ multiple antenna arrays with distinct FOVs that are coupled to a single backend PCB (e.g., the PCBs 116, 404) that includes a hardware logic component (e.g., the hardware logic component 220). Referring again to FIG. 2, the hardware logic component 220 can be configured to receive radar data from the ADC banks 214-218 and to output a single set of detections in a common coordinate system based upon the radar data from all of the ADC banks 214-218. Thus, the radar sensors 100, 400 and the radar sensor system 200 can improve perception of the AV 600 increasing the FOV able to be scanned by a single radar sensor package and by potentially reducing the amount of radar data processing that must be done by the computing system 616, which may have scarce computing resources allocated to other tasks such as planning and control.

Figure 7:
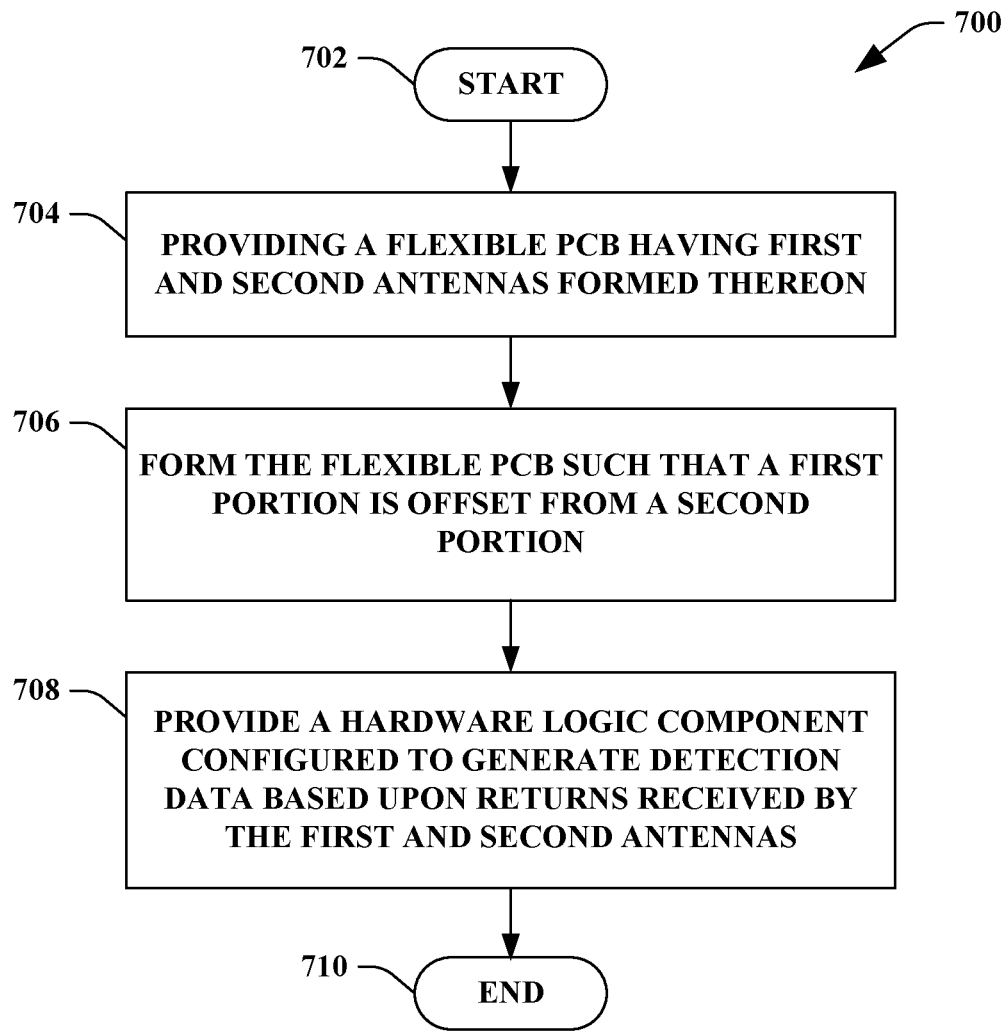
FIG. 7 is a flow diagram illustrating an exemplary methodology for making a radar sensor.

FIG. 7 illustrates an exemplary methodology relating to making radar sensor that includes antenna arrays with different FOVs. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for controlling operation of an AV based upon radar is illustrated. The methodology 700 starts at 702, and at 704 a flexible PCB is provided. The flexible PCB has a first antenna and a second antenna formed thereon. In exemplary embodiments, the first antenna can be included in a first antenna array and the second antenna array can be included in a second antenna array that does not include the first antenna. At 706, the flexible PCB is formed such that a first portion of the flexible PCB is offset from a second portion of the flexible PCB. By way of example, the first portion of the flexible PCB can be a portion of the flexible PCB that includes the first antenna, and the second portion of the flexible PCB can be a portion of the flexible PCB that includes the second antenna. At 706, the flexible PCB can be formed such that the first antenna and the second antenna have different FOVs. At 708 a hardware logic component such as an FPGA or an ASIC is provided, wherein the hardware logic component is configured to generate detection data based upon radar returns received by the first and second antennas. In exemplary embodiments, the flexible PCB can be a frontend PCB that is configured to facilitate transmission and receipt of radar signals by way of the first and second antennas. In various embodiments, the hardware logic component can be included on a backend PCB that is configured to receive radar data from the frontend PCB and to output detection data to other devices (e.g., the computing device 616 of the AV 600). The methodology 700 ends at 710.

Figure 8:
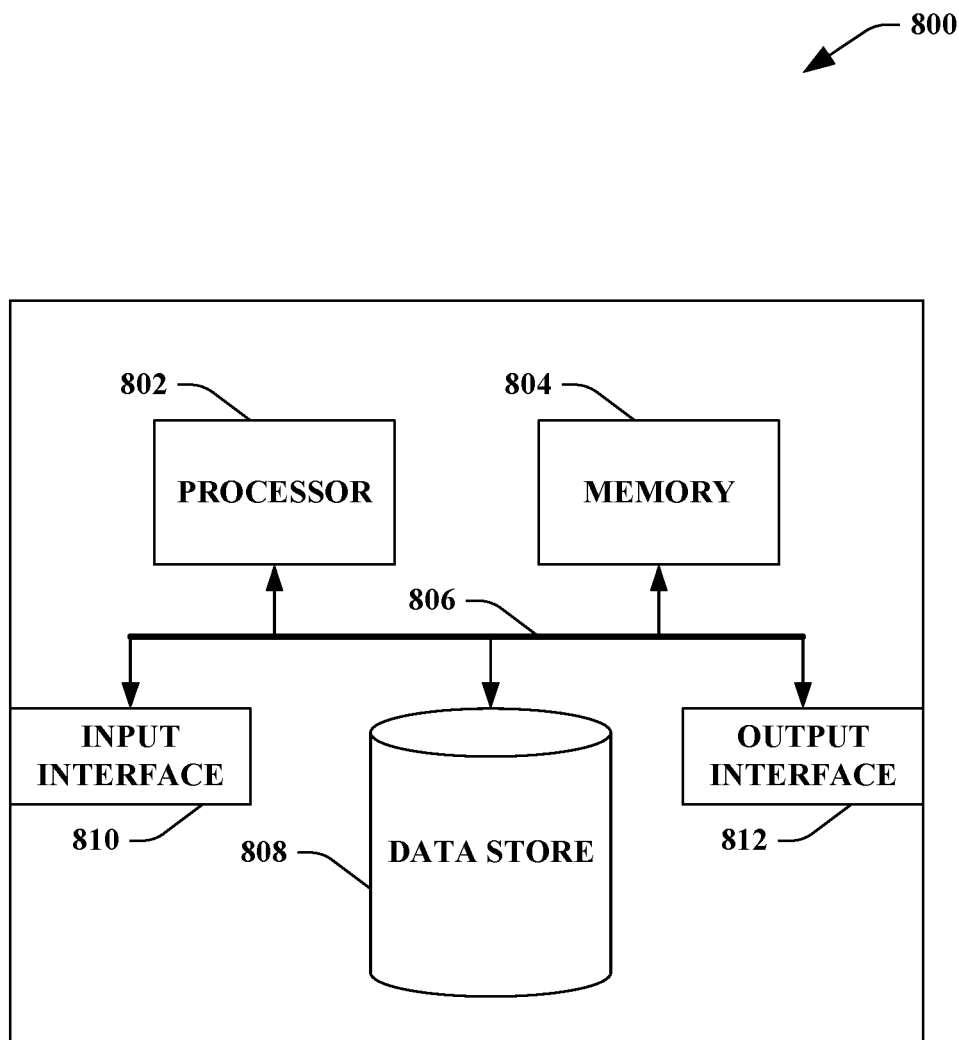
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be or include the computing system 616. The computing device 800 includes at least one processor 802 that executes instructions that are stored in a memory 804. The instructions may be, for instance, instructions for implementing functionality described as being carried out by one or more modules, components, or systems discussed above or instructions for implementing one or more of the methods described above.

The processor 802 may be a GPU, a plurality of GPUs, a CPU, a plurality of CPUs, a multi-core processor, etc. The processor 802 may access the memory 804 by way of a system bus/communication interface 806. In addition to storing executable instructions, the memory 804 may also store radar data, detection data, etc.

The computing device 800 additionally includes a data store 808 that is accessible by the processor 802 by way of the system bus/communication interface 806. The data store 808 may include executable instructions, sensor data, radar data, detection data, etc. The computing device 800 also includes an input interface 810 that allows external devices to communicate with the computing device 800. For instance, the input interface 810 may be used to receive instructions from an external computing device, etc. The computing device 800 also includes an output interface 812 that interfaces the computing device 800 with one or more external devices. For example, the computing device 800 may transmit control signals to the vehicle propulsion system 610, the braking system 612, and/or the steering system 614 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

The features described herein relate to systems and methods for a radar sensor with multiple FOVs according to at least the examples provided below:

(A1) In one aspect, some embodiments include a radar sensor that includes a flexible PCB. The flexible PCB includes a first portion and a second portion, wherein the first portion and the second portion are offset from one another. The radar sensor further includes a first radar antenna positioned on the first portion of the PCB, wherein the first radar antenna is configured to receive radar signals from a first FOV. The radar sensor additionally includes a second radar antenna positioned on the second portion of the PCB, wherein the second radar antenna is configured to receive radar signals from a second FOV.

(A2) In some embodiments of the radar sensor of (A1), the flexible PCB holds its shape without external constraint such that the first portion and the second portion remain offset from one another.

(A3) In some embodiments of the radar sensor of at least one of (A1)-(A2), the first FOV and the second FOV partially overlap.

(A4) In some embodiments of the radar sensor of at least one of (A1)-(A3), the radar sensor further includes a second PCB a third radar antenna positioned on the second PCB, wherein the third radar antenna is configured to receive radar signals from a third FOV, wherein the third FOV partially overlaps with at least one of the first FOV or the second FOV.

(A5) In some embodiments of the radar sensor of (A4), the radar sensor further includes a hardware logic component. The hardware logic component is configured to receive radar data representative of radar returns received by the first, second, and third radar antennas. The hardware logic component is further configured to output detection data that is indicative of objects in the first, second, and third FOVs based upon the radar data.

(A6) In some embodiments of the radar sensor of (A5) the detection data includes at least one of a position or a velocity of an object.

(A7) In some embodiments of the radar sensor of at least one of (A5)-(A6), the radar sensor further includes a third PCB and the hardware logic component is disposed on the third PCB.

(A8) In some embodiments of the radar sensor of at least one of (A1)-(A3), the radar sensor includes a hardware logic component that is configured to receive radar data that is representative of radar returns received by the first and second radar antennas. The hardware logic component is further configured to output detection data that is indicative of objects in the first and second FOVs based upon the radar data.

(A9) In some embodiments of the radar sensor of at least one of (A1)-(A8), the flexible PCB further includes an analog-to-digital converter (ADC) bank that is configured to digitally sample signals received from the first radar antenna and the second radar antenna to generate the radar data.

(A10) In some embodiments of the radar sensor of at least one of (A1)-(A9), the first portion and the second portion are offset from one another such that the first FOV and the second FOV are pointed in a substantially same direction.

(A11) In some embodiments of the radar sensor of at least one of (A1)-(A9), the first portion and the second portion are offset from one another such that the first FOV is pointed in a first direction and the second FOV is pointed in a second direction that is different from the first direction.

(A12) In some embodiments of the radar sensor of (A11), the first direction is offset from the second direction by an angle of between 10° and 60°.

(B1) In another aspect, some embodiments include a method that includes receiving a first radar return by way of a first radar antenna positioned on a first portion of a flexible PCB. The method further includes receiving a second radar return by way of a second radar antenna positioned on a second portion of the flexible PCB, wherein the first portion of the flexible PCB and the second portion of the flexible PCB are offset from one another such that the first radar antenna has a first FOV and the second radar antenna has a second FOV. The method also includes generating detection data based upon the first radar return and the second radar return, where the detection data is indicative of points on surfaces of objects in the first FOV and the second FOV. The method additionally includes outputting the detection data to a computing device, wherein the computing device is configured to compute a maneuver for an AV based upon the detection data.

(B2) In some embodiments of the method of (B1), the method further includes identifying, by way of the computing device and based upon the detection data, a region of space in a driving environment of the AV that includes an object, and computing the maneuver for the AV based upon the object being included in the region of space.

(C1) In still another aspect, some embodiments include a vehicle that includes a radar sensor that receives radar returns from an operating environment of the vehicle. The radar sensor includes a flexible PCB that itself includes a first portion and a second portion, where the first portion and the second portion are offset from one another. The radar sensor additionally includes a first radar antenna positioned on the first portion of the flexible PCB so that the first radar antenna receives radar returns from a first FOV. The radar sensor also includes a second radar antenna positioned on the second portion of the flexible PCB, so that the second radar antenna receives radar returns from a second FOV.

(C2) In some embodiments of the vehicle of (C1), the radar sensor further comprises a hardware logic component. The hardware logic component is configured to output detection data based upon the radar returns received by the first radar antenna and the second radar antenna, where the detection data is indicative of positions of objects in the operating environment.

(C3) In some embodiments of the vehicle of (C2), the vehicle is an AV that further includes a computing device. The computing device includes a processor and memory that stores instructions that are executed by the processor. When the instructions are executed by the processor, the processor performs various acts. The acts include receiving the detection data from the hardware logic component and planning a maneuver to be executed by the vehicle based upon the positions of the objects in the operating environment.

(C4) In some embodiments of the vehicle of (C1), the vehicles includes a computing device. The computing device includes a processor and memory that stores instructions that are executed by the processor. When the instructions are executed by the processor, the processor performs various acts. The acts include receiving radar data indicative of the radar returns received by the first radar antenna and the second radar antenna, and generating detection data based upon the radar data, where the detection data is indicative of positions of objects in the operating environment of the vehicle.

(C5) In some embodiments of the vehicle of at least one of (C1)-(C4), the first FOV and the second FOV are offset from one another by an angle between 10° and 60°.

(C6) In some embodiments of the vehicle of at least one of (C1)-(C4), the first FOV and the second FOV are aimed in a same direction.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radar sensor comprising:
   a flexible printed circuit board (PCB) comprising:
     a first portion of the flexible PCB; and
     a second portion of the same flexible PCB, wherein the first portion and the second portion are offset from one another on the flexible PCB;
   a first radar antenna positioned on the first portion of the flexible PCB, wherein the first radar antenna is configured to receive radar signals from a first field of view (FOV);
   a second radar antenna positioned on the second portion of the flexible PCB, wherein the second radar antenna is configured to receive radar signals from a second FOV;
   a rigid PCB; and
   a third radar antenna positioned on the rigid PCB, wherein the third radar antenna is configured to receive radar signals from a third FOV, wherein the third FOV partially overlaps with at least one of the first FOV or the second FOV.

2. The radar sensor of claim 1, wherein the flexible PCB holds its shape without external constraint such that the first portion and the second portion remain offset from one another.

3. The radar sensor of claim 1, wherein the first FOV and the second FOV partially overlap.

4. The radar sensor of claim 1, further comprising a hardware logic component, the hardware logic component configured to receive radar data representative of radar returns received by the first, second, and third radar antennas, the hardware logic component further configured to output detection data that is indicative of objects in the first, second, and third FOVs based upon the radar data.

5. The radar sensor of claim 4, wherein the detection data includes at least one of a position or a velocity of an object.

6. The radar sensor of claim 4, further comprising:
   a third PCB, the hardware logic component disposed on the third PCB; and
   a communication link, wherein the communication link comprises an interface between the flexible PCB, the rigid PCB, and the third PCB.

7. The radar sensor of claim 1, further comprising a hardware logic component, the hardware logic component configured to receive radar data that is representative of radar returns received by the first and second radar antennas, the hardware logic component further configured to output detection data that is indicative of objects in the first and second FOVs based upon the radar data.

8. The radar sensor of claim 7, wherein the flexible PCB further includes an analog-to-digital converter (ADC) bank that is configured to digitally sample signals received from the first radar antenna and the second radar antenna to generate the radar data.

9. The radar sensor of claim 1, wherein the first portion and the second portion are offset from one another and the first FOV and the second FOV are pointed in a substantially same direction such that the first portion comprises a first plane in the flexible PCB, the second portion comprises a second plane in the flexible PCB, and the first plane and the second plane are parallel to one another.

10. The radar sensor of claim 1, wherein the first portion and the second portion are offset from one another such that the first FOV is pointed in a first direction and the second FOV is pointed in a second direction that is different from the first direction.

11. The radar sensor of claim 10, wherein the first direction is offset from the second direction by an angle of between 10° and 60°.

12. A vehicle, comprising:
a radar sensor that receives radar returns from an operating environment of the vehicle, the radar sensor comprising:
   a flexible printed circuit board (PCB) comprising:
      a first portion of the flexible PCB; and
      a second portion of the same flexible PCB, wherein the first portion and the second portion are offset from one another on the flexible PCB;
   a first radar antenna positioned on the first portion of the flexible PCB, wherein the first radar antenna is configured to receive radar returns from a first field of view (FOV);
   a second radar antenna positioned on the second portion of the flexible PCB, wherein the second radar antenna is configured to receive radar returns from a second FOV;
   a rigid PCB; and
   a third radar antenna positioned on the rigid PCB, wherein the third radar antenna is configured to receive radar signals from a third FOV, wherein the third FOV partially overlaps with at least one of the first FOV or the second FOV.

13. The vehicle of claim 12, wherein the radar sensor further comprises a hardware logic component, the hardware logic component configured to output detection data based upon the radar returns received by the first radar antenna and the second radar antenna, the detection data indicative of positions of objects in the operating environment.

14. The vehicle of claim 13, wherein the vehicle is an autonomous vehicle, the vehicle further comprising a computing device, the computing device comprising:
a processor; and
memory that stores instructions that, when executed by the processor, cause the processor to perform acts comprising:
   receiving the detection data from the hardware logic component; and
   planning a maneuver to be executed by the vehicle based upon the positions of the objects in the operating environment.

15. The vehicle of claim 12, further comprising a computing device, wherein the computing device comprises:
a processor; and
memory that stores instructions that, when executed by the processor, cause the processor to perform acts comprising:
   receiving radar data indicative of the radar returns received by the first radar antenna and the second radar antenna; and
   generating detection data based upon the radar data, the detection data indicative of positions of objects in the operating environment of the vehicle.

16. The vehicle of claim 12, wherein the first FOV and the second FOV are offset from one another by an angle between 10° and 60°.

17. The vehicle of claim 12, wherein the first FOV and the second FOV are aimed in a same direction such that the first portion comprises a first plane in the flexible PCB, the second portion comprises a second plane in the flexible PCB, and the first plane and the second plane are parallel to one another.

* * * * *